United States Patent [19]

Hitchin

[11] Patent Number: 4,491,172
[45] Date of Patent: Jan. 1, 1985

[54] ENERGY STORAGE APPARATUS

[75] Inventor: James Hitchin, Del Mar, Calif.

[73] Assignee: Thermal Energy Storage, Inc., San Diego, Calif.

[21] Appl. No.: 256,595

[22] Filed: Apr. 22, 1981

[51] Int. Cl.³ .................. F28D 17/00; F28D 21/00
[52] U.S. Cl. .......................... 165/10; 165/104.11; 165/140; 126/435; 126/436; 252/70
[58] Field of Search ............. 165/10, 104.11, 140; 252/70; 126/436, 435

[56] References Cited

U.S. PATENT DOCUMENTS

| | | | |
|---|---|---|---|
| 3,719,225 | 3/1973 | Mebjean | 165/10 X |
| 4,152,899 | 5/1979 | Herrick | 252/70 X |
| 4,180,124 | 12/1979 | Shurcliff | 165/104.11 X |
| 4,270,523 | 6/1981 | Heel | 126/436 X |
| 4,280,553 | 7/1981 | Bean et al. | 165/104.17 X |
| 4,294,078 | 10/1981 | MacCracken | 126/436 X |

FOREIGN PATENT DOCUMENTS

| | | | |
|---|---|---|---|
| 2828675 | 1/1980 | Fed. Rep. of Germany | 126/436 |
| 11343 | 2/1978 | Japan | 165/10 |

*Primary Examiner*—Albert W. Davis, Jr.

*Attorney, Agent, or Firm*—Ellsworth R. Roston; Charles H. Schwartz

[57] ABSTRACT

A container holds a heat storage medium such as aqueous sodium thiosulfate having properties of melting into a liquid and crystallizing into a solid and saturated solution in a particular temperature range and of storing energy when converted to the molten state and of releasing such stored energy when crystallized. The sodium thiosulfate liquid may be chemically basic by the addition to the liquid of a suitable soluble additive material such as disodium hydrogen phosphate or trisodium phosphate or both. First and second tubes made from a suitable heat conducting material such as aluminum are disposed in the container in spaced and nested relationship to one another. The tubes may be joined by connecting members also made from aluminum. The first tubes are connected to provide for the circulation of a first fluid through the tubes to transfer energy to the heat storge medium for melting the material and further heating it above the melting interval. The second tubes are connected to provide for the circulation of a second fluid through the tubes to transfer heat from the storage medium. The heat storage medium may be stirred while in the liquid state but the stirring may be discontinued when the medium solidifies at crystallization.

10 Claims, 6 Drawing Figures

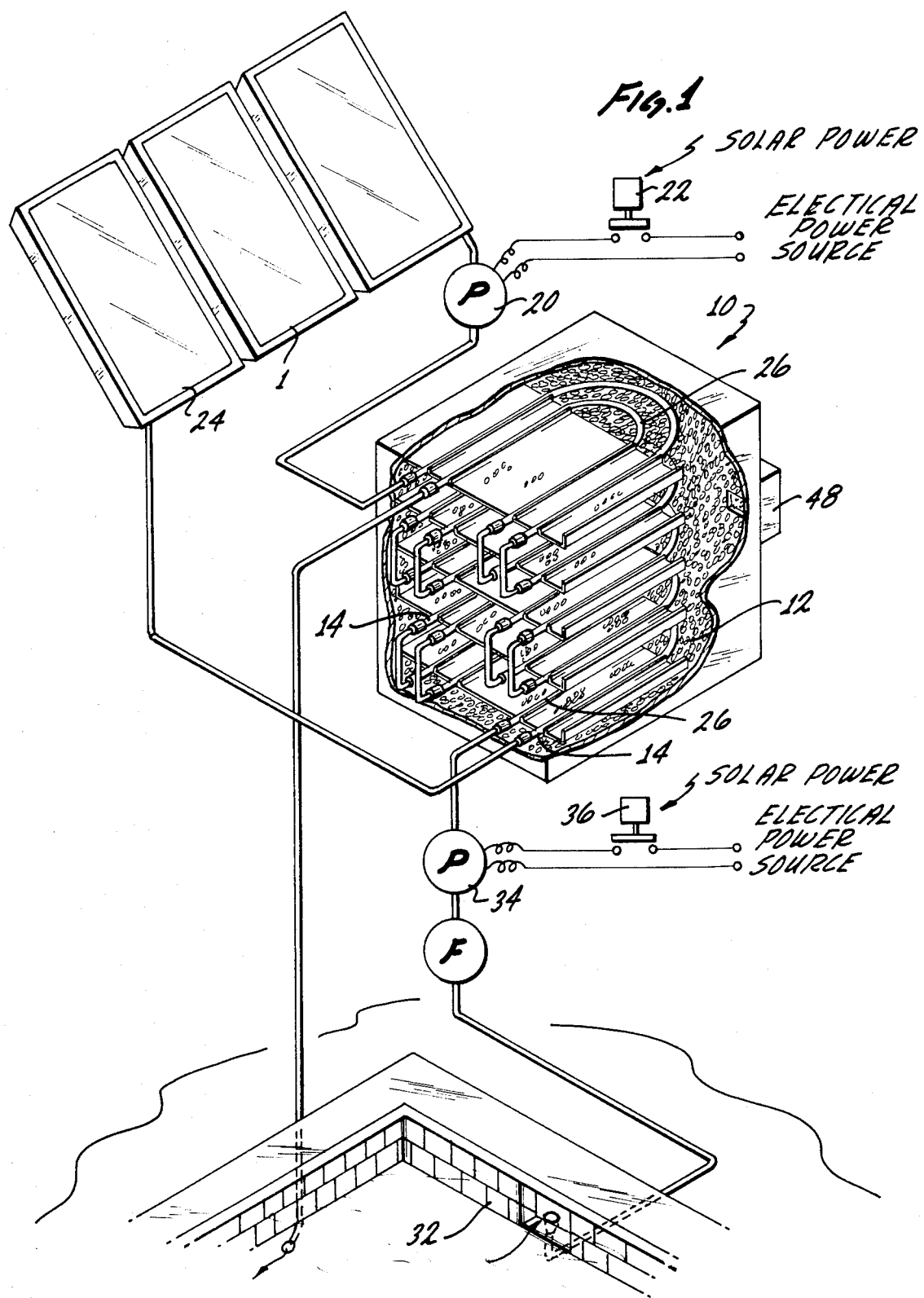

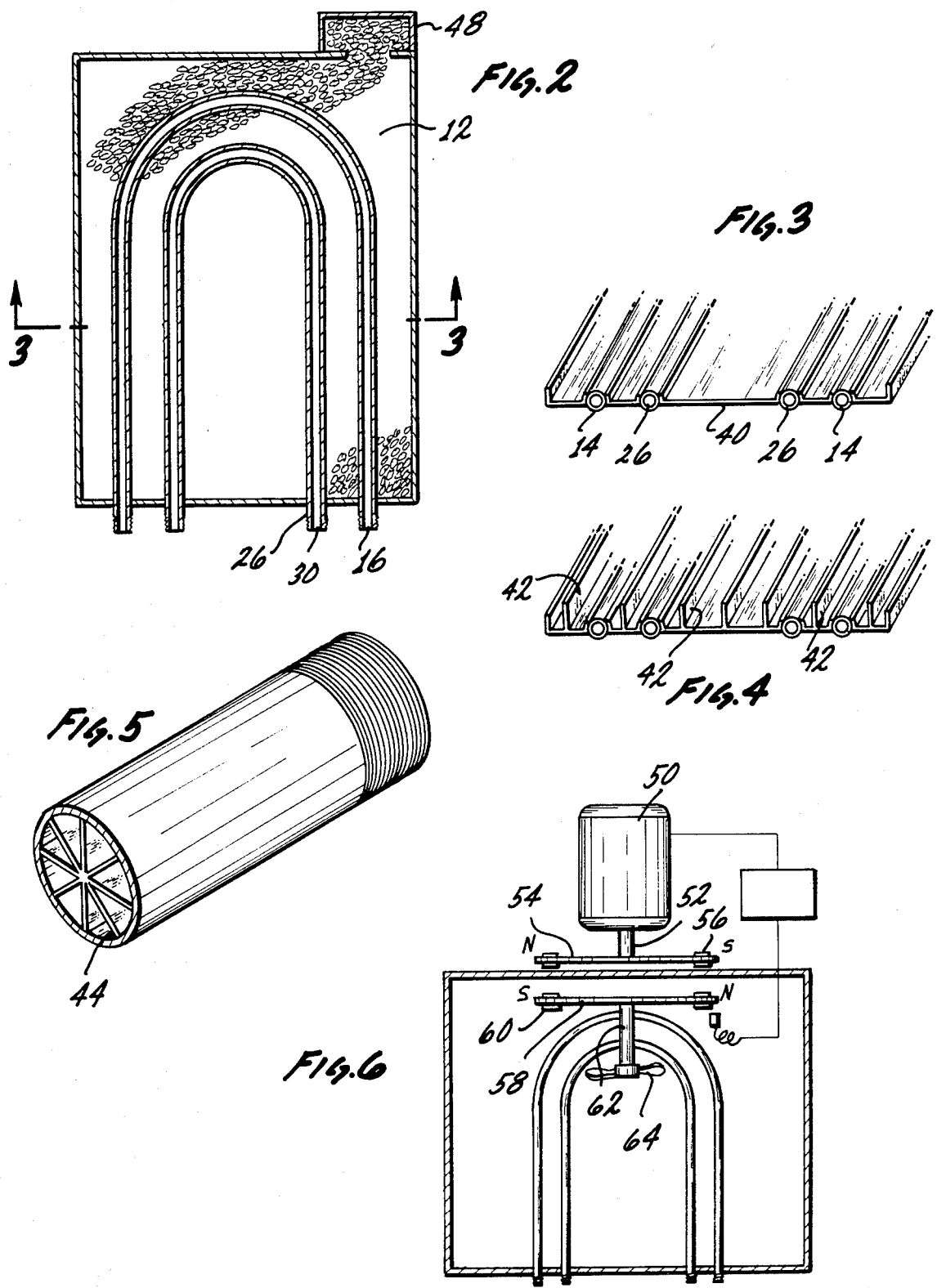

ENERGY STORAGE APPARATUS

This invention relates to apparatus for providing an efficient storage of energy and for providing for an efficient release of such energy at particular times.

As the cost of fossil energy and other depletable sources of energy rises, expanded efforts are being made to obtain energy from alternative sources such as the sun. However, this source has certain limitations. For example, solar energy is available on Earth only during daylight hours and may then be attenuated by clouds. As a result, the solar energy must be stored when available and then released at times, such as during the night, or during cloudy conditions when energy from the sun cannot be directly provided. Another intermittent source requiring storage is low cost electricity at night by many power distributors.

Although considerable effort has been made to provide an efficient system for storing solar energy, a satisfactory system has still not been provided. This has resulted from the fact that the solar energy accumulated as sensible heat in the systems now in use is stored at relatively low energy density and is being progressively dissipated with time. As a result, only a relatively small proportion of the energy captured from intermittent sources such as the sun has been available for subsequent use in such systems and the energy, when drawn from such systems, appears at decreasing temperatures as the heat storage medium is being cooled. Storage media such as rocks have proven to be a potential health hazard because of their designation of radon gas into the air used for heat removal. Other systems, using phase change materials, have been designed to overcome these limitations, but suffer from other shorcomings such as incongruent melting and inefficient heat transfer. Such systems also have shortcomings in that they lead to formation of refractory phases with low latent heat of crystallization and low solubility.

This invention provides apparatus which overcomes the above difficulties. For example, the apparatus of this invention is able to store solar energy for controlled periods of time, and even indefinitely, without any significant loss in such energy. Furthermore, the apparatus of this invention is able to provide an efficient transfer of solar energy and other forms of energy to the storage medium and an efficient transfer of the stored energy at acceptable temperatures to an outlet for such energy such as for use as water or space heating.

In the apparatus of this invention, a container holds a heat storage medium such as aqueous sodium thiosulfate having properties of melting and crystallizing in a particular range of temperatures and of storing energy when converted to the molten state and of releasing such energy when crystallized. The sodium thiosulfate liquid may be chemically basic by the addition to the liquid of a suitable soluble material such as disodium hydrogen phosphate or trisodium phosphate or both. The increase of pH and buffering of the melt prevents the gradual decomposition of sodium thiosulfate that otherwise takes place leading to deterioration of the heat storage medium. This solute also has properties of controlling the size and adhesion properties of the crystals which preferentially form on the heat exchanger surfaces when the latent heat of crystallization is withdrawn from the melt. Alternatively, the potassium and ammonium analogs may be respectively substituted for the disodium hydrogen phosphate and trisodium phosphate.

First and second tubes are disposed in the container, preferably in spaced and nested relationship to one another. The tubes are preferably made from a suitable heat conducting material such as aluminum because aluminum will not corrode in aqueous sodium thiosulfate buffered in the pH range 8-10 by the dissolved phosphate. Pairs of the first and second tubes are bridged by a connecting member which may also be made from aluminum.

The first tubes are connected to provide for the passage of a first fluid through the tubes to transfer solar energy or other forms of energy as heat to the first fluid. The heat is then transferred from the first fluid to the heat storage medium to melt this medium and to heat it further above the melting range. The second tubes are connected to provide for the passage of a second fluid through the tubes to transfer heat from the storage medium to an outlet such as hot tap water or a heat exchanger for space heating.

The heat storage medium may be stirred while in the liquid state to insure an efficient transfer of heat to the heat exchanger fluid. However, the stirring may be discontinued when the medium solidifies at crystallization.

In the drawings:

FIG. 1 is a schematic view, partially in perspective, of apparatus constituting one embodiment of this invention for storing solar or other intermittently available energy and for providing for a release of this energy at particular times;

FIG. 2 is a sectional view of heat transfer members included in the embodiment shown in FIG. 1;

FIG. 3 is a sectional view of the heat transfer members shown in FIG. 2 and is taken substantially on the line 3—3 of FIG. 2;

FIG. 4 is a sectional view of heat transfer members forming a modification of the members shown in FIG. 3;

FIG. 5 is a perspective view of a further modification to the heat transfer members shown in FIG. 3; and FIG. 6 is a sectional view of additional apparatus which may be included in the heat transfer apparatus shown in FIG. 1.

In one embodiment of the invention, a container generally indicated at 10 is provided. The container 10 may be made from any suitable material including fiberglas or high density polyethylene. If the container 10 is made from a different material than fiberglass or high density polyethylene, its interior walls may be lined with fiberglass or high density polyethylene or a material providing a similar vapor barrier. However, the container may be made from other suitable material such as aluminum.

The container 10 is filled with a heat storage medium 12. Preferably, the heat storage medium is provided with properties of melting in a particular temperature range of limited values and of crystallizing in such particular temperature range. The heat storage medium has properties of receiving heat to become congruently converted to the molten state without the intervention of any second phase of lower solubility and of retaining this heat in a liquid supercooled state for an indefinite period of time without loss of any latent heat of crystallization. The supercooled liquid further has properties of being nucleated on a controlled basis to the crystalline state and of releasing the stored latent heat when thus nucleated.

Preferably the heat storage medium constitutes sodium thiosulphate in the α-pentahydrate phase. The sodium thiosulphate may be adjusted with a solvent such as water, or with another suitable solid, to peritectic composition, ensuring congruent melting. Sodium thiosupphate in such a system has properties of storing considerable amounts of heat as latent heat of melting, and as sensible heat above and below the peritectic temperature, and of releasing such considerable amounts of heat when crystallization is induced by nucleation. However, other compounds combined with a second phase or alone may also be used. These include sodium sulfate decahydrate, calcium chloride hexahydrate, calcium nitrate tetrahydrate, magnesium chloride hexahydrate alone or in eutectic proportions, magnesium nitrate hexahydrate, disodium hydrogen phosphate dodecahydrate, trisodium phosphate dodecahydrate, sodium acetate trihydrate, pinacol hexahydrate and various paraffins and waxes.

A soluble additive material is preferably dissolved in the liquid heat storage medium. The soluble additive material controls the size and habit of the crystals produced in the heat storage medium when heat is removed at the liquidus temperature, or when the heat storage medium is nucleated. Preferably the additive solute constitutes disodium hydrogen phosphate or trisodium phosphate or a combination or both. When disodium hydrogen phosphate or trisodium phosphate is used as the liquid additive material, it also controls the pH of the liquid so that the liquid is chemically basic. By controlling the relative amounts of the disodium hydrogen phosphate and trisodium phosphate in the liquid, the pH of the liquid can be maintained in a range of approximately eight (8) to eleven (11). Preferably the relative amount of the disodium hydrogen phosphate and trisodium phosphate in the medium is maintained between approximately two percent (2%) and four percent (4%) by weight. The potassium and ammonium analogs may be respectively used instead of disodium hydrogen phosphate and trisodium phosphate. This particular additive is only applicable when the heat storage medium consists of such materials as sodium thiosulfate, sodium sulfate or sodium acetate.

A material such as disodium hydrogen phosphate or trisodium phosphate when added in low concentration for controlling the pH and the crystal texture of the medium is also advantageous because it does not attack commonly used fiberglass resins or the glass fiber in such composite material and also does not attack such metals as aluminum.

The use of disodium hydrogen phosphate or trisodium phosphate, or a combination of both, as the soluble additive material is disclosed and claimed in copending application Ser. No. 254,547 filed on Apr. 15, 1981, now U.S. Pat. No. 4,391,267, by Gustaf Arrhenius for a "Heat Storage Material" and assigned of record to Kay Laboratories, Inc. The asignee of record of this application has a cross-licensing arrangement with Kay Laboratories, Inc.

A plurality of tubes 14 or hollow coils are disposed in the heat storage medium 12 in spaced relationship to one another. The tubes 14 are preferably provided with a looped or U-shaped configuration with the legs of the U extending from the container 10. The tubes 14 are connected in a series relationship or in a parallel relationship or in a combination of series and parallel. The tubes 14 are preferably made from a suitable heat-conducting material such as aluminum. Although aluminum has less heat conductivity than copper, it does not corrode in the heat storage media such as sodium thiosulfate, particularly when the medium is chemically maintained moderately basic. However, the tubes 14 may have an insert of copper or plastic or other material which may be compatible with the heat transfer fluid.

The tubes 14 are filled with a suitable fluid 15 such as distilled water or another aqueous or a non-aqueous heat transfer liquid and are connected in a closed circuit with a reservoir 18 of the fluid, a pump 10 and a switch 22. The switch 22 is responsive to solar heat to provide for an operation of the pump when solar heating of the heat transfer fluid is being provided, such as occurs during daylight hours on a sunny day. When the pump operates, it tends to pass, into the reservoir 18, fluid 16 which has been heated by solar panels 24 in a conventional manner. Although solar energy is discussed as the source of energy, it will be appreciated that other energy sources may also be used. For example, electricity at non-peak hours may also be used since electricity is relatively inexpensive at such times. Industrial waste heat or fireplace waste heat may also be used.

A plurality of tubes 26 or hollow coils are also disposed in the container and are also preferably made from aluminum. The tubes 26 may have an insert such a copper or plastic in a manner similar to that described above for the tubes 14. The tubes 26 are disposed in spaced and nested relationship to the tubes 14. The tubes 26 are preferably disposed in a looped or U-shaped configuration with the legs of the U extending from the container 10. The tubes 26 are connected in a series or parallel relationship or a combination of both. The tubes 26 are preferably paired with the tubes 14. The spacing between the paired tubes 14 and 26 are preferably in the order of a few inches when the tubes are disposed in a container having a width, height and length of several feet.

A suitable fluid 30 such as water or other heat transfer fluid is disposed in the tubes 26. The fluid 30 is adapted to be recirculated through a system including a member 32 to be heated. For example, the member 32 may be a water heater which is provided to heat cold water, or the member 32 may be a space heater. A pump 34 and a switch 36 may be included in a fluid circuit with the tubes 26 and the member 32 to provide for the flow of the fluid 30 through the circuit. The switch 36 may be closed in any suitable manner such as by a timer.

Instead of being connected as described above, the tubes 14 and 26 may be connected in parallel to decrease the drop in system pressure. The parallel tubes 14 and 26 may be connected to the source of heat or the load or both the source and the load.

Connecting or bridging members 40 (FIG. 3) made from a suitable material such as aluminum ar disposed between the paired tubes 14 and 26 to brace the tubes and to facilitate the transfer of heat between the heat storage medium 12 and the fluid in the tubes 14 and 26. The connecting or bridging members 40 also facilitate the simultaneous formation of the paired tubes 14 and 26 in a single operation. Fins 42 (FIG. 4) may be provided on the connecting members 40 and the tubes 14 and 26 to facilitate such transfer. When the fins 42 are provided, the fins preferably terminate at a position within the container 10 so that a connection from the tubes 14 and 26 to the tubes external to the container 10 will not be impeded.

Upon the closure of the switch 22, the solar heat obtained from the solar panels 24 is transferred to the fluid 16. This fluid is circulated through the tubes 14 to heat the supercooled fluid 12 to the particular temperature range. This causes the heat storage medium 12 to melt and to store the heat in the molten state. If the medium is allowed to supercool, the latent heat of melting can then be stored without any loss until such time as it is desired to release such stored energy by nucleation.

When it is desired to use the stored latent heat of crystallization, the supercooled liquid 12 is nucleated and begins to crystallize. This causes the latent heat stored in the supercooled liquid 12 to become liberated as the temperature of the heat storage medium rises to the peritectic temperature and the main portion of the liquid crystallizes. This released heat is transferred to the fluid 30 in the tubes 26 when the switch 36 becomes closed. This heated fluid is then introduced to the member 32 to heat the member.

The nucleation of the liquid heat storage medium 12 may be controlled by a portion of the heat storage medium or another crystalline nucleation agent kept in solid crystalline state in a snout 48 which extends from the container 10. The crystalline solid in the snout 48 may have the same composition as the solid forming in equilibrium with the liquid medium 12 in the container 12. The snout 48 may constitute a pipe extending from the container for a few inches when the container 10 has the size discussed above. The snout 48 may be made from a suitable material such as aluminum or other material with sufficiently high heat conductivity to retain the seed crystals in the snout near ambient temperature and well below the temperature where melting is complete.

The crystalline nucleation material in the snout 48 is subjected to ambient temperatures because the snout is exposed to the atmosphere. The nucleation agent is a solid crystalline material at and below ambient (room) temperature and remains solid also at higher temperatures. In the case where it consists of the main compound of the heat storaged medium (e.g. sodium thiosulfate pentahydrate or sodium acetate trihydrate), it would not melt unless it reaches the peritectic melting temperature of the heat storage medium. Keeping it near ambient temperature prevents it from ever melting.

If desired, the nucleation by the snout 48 of the molten heat storage medium in the container 10 may be avoided, permitting the molten heat storage medium to persist as a supercooled liquid at temperatures down to ambient of practically unlimited times. In this way, the latent heat of crystallization can be stored any length of time. The arrangement for preventing nucleation may consist of a valve at the base of the snout, and embedded within, and isothermal with, the heat storage medium. This interior, basal part of the snout should then be constructed of a material with low heat conductivity, such as a plastic. The valve should then be operated with a linkage through the heat storage medium. Storage of the latent heat of crystallization for indefinite periods of time may be particularly advantageous for temporarily or irregularly occupied buildings such as mountain cabins.

It will be appreciated that the snout 48 is only one convenient way of instituting the nucleation of the heat storage material and that other nucleation techniques may also be used. Some of these techniques provide for the institution of nucleation at any convenient instant of time. A number of different techniques for instituting nucleation of a heat storage material are known in the prior art.

An arrangement (FIG. 6) may be provided for stirring the melt 12 in the container 10. This arrangement includes a motor 50 having a drift shaft 52 for rotating a disc 54 disposed externally of the container 10. The disc 54 is provided with south and north poles 56 at opposite diametrical ends.

The disc 54 is disposed in magnetically coupled relationship to a disc 58 within the container 10. The disc 58 is provided with north and south poles 60 at diametrically opposite ends. A shaft 62 extends downwardly into the heat storage medium 12 from the disc 58. A stirrer 64 is disposed at the bottom end of the shaft 62 to stir the melt.

A sensor 66 is disposed adjacent the disc 58 at one diametrical end of the disc. The sensor 66 may constitute a semiconductor diode (well known in the art) which is responsive to the opposite magnetic poles 60 on the disc 58 to distribute ions in the two electrodes of the diodes in accordance with the magnetic polarity of the pole acting upon it. The sensor 66 may operate on the basis of a Hall effect to produce a pulsating signal as the north and south poles 60 on the disc 58 rotate past the sensor. The sensor 66 may be connected in a circuit with the motor 50 to provide for an operation of the motor until the heat storage medium 12 becomes sufficiently crystallized to impede the rotation of the disc 58.

During the time that the motor 50 is operated, it drives the disc 54. Because of the magnetic coupling between the discs 54 and 58, the disc 54 in turn drives the disc 58 while the heat storage medium 12 is in a fluid state. This causes the fluid crystallizing heat storage medium to be mixed so that (a) crystals, preferentially forming on the heat exchanger surfaces, deteriorating the heat transfer, can be removed by frictional stres in the circulating fluid and (b) heat transfer is improved by forcing the heat storage medium into contact with the heat exchanger.

When the viscosity in the crystallizing heat storage medium rises above a certain limit due to the increasing volume of crystals over liquid, this viscous resistance prevents the disc 58 from rotating. The disc 58 accordingly slips relative to the disc 54 even if the disc 54 should continue to be rotated by the motor 50. Since the disc 58 no longer rotates, a pulsating signal is not longer produced by the sensor 60. This causes the operation of the motor 50 to become interrupted, thereby conserving energy.

The apparatus described above has certain important advantages. It provides for an efficient transfer of heat into and out of the heat storage medium and an efficient storage of heat in a form in which the latent heat of crystallization can be released at any selective time and at a predetermined, practically useful temperature or temperature range. Furthermore, the storage of latent heat of crystallization can occur for an indefinite period of time without any loss of this particular component during such period of storage.

The apparatus also has other advantages of some importance. For example, by using separate tubes 14 and 26, the circulating fluids 16 and 30 can be maintained isolated from each other. This considerably expands the uses which can be made of the apparatus constituting this invention. By way of illustration, the fluid 30 can be a food material which is heated by the energy stored in the apparatus of this invention. If this food material were to be contacted by the heat storage material or by the heat transfer fluid 16, it might be considered inedible from the standpoint of strict health standards. Water, either for drinking or washing, may also have to be separated in this manner in the tubes 14 from the heat storage material and the fluid in the tubes 26. As will be appreciated, the isolation of the fluids 16 and 30 is facilitated by the use of aluminum for the tubes 14 and 26 because aluminum is not corroded by the heat storage media.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination in apparatus for storing energy and for providing for a subsequent use of such energy as heat, a container, first tubes disposed in looped and spaced relationship in the container and connected to provide for the passage of a first fluid through the tubes, means for providing for the passage of the first fluid through the first tubes at first controlled times, second tubes disposed in looped and spaced relationship in the container and in the same planes as the first tubes and connected to provide for the passage of a second fluid through the tubes at second controlled times corresponding to the release from the container of the heat stored in the container, and a heat storage medium disposed in the container and having properties of melting and crystallizing in a particular temperature range and of storing heat in the melted state and of releasing heat when nucleated into the crystalline state in the particular temperature range, the heat storage medium abutting the first tubes to become melted and further heated at the first controlled times and abutting the second tubes to transfer to the fluid in the second tubes the heat stored in the heat storage medium, a plurality of connecting members each made from a heat conducting metal and each connected in the planes common to the first and second tubes, between individual ones of the first tubes and individual ones of the second tubes in the common planes.

2. In combination in apparatus for storing energy and for providing for a subsequent use of such energy as heat, a container, first tubes disposed in looped and spaced relationship in the container and connected to provide for the passage of a first fluid through the tubes, means for providing for the passage of the first fluid through the first tubes at first controlled times, second tubes disposed in looped and spaced relationship in the container and in planes common to the first tubes and connected to provide for the passage of a second fluid through the tubes at second controlled times corresponding to the release from the container of the heat stored in the container, and a heat storage medium disposed in the container and having properties of melting and crystallizing in a particular temperature range and of storing heat in the molten state and of releasing heat when nucleated into the crystalline state in the particular temperature range, the heat storage medium abutting the first tubes to become melted and further heated at the first controlled times and abutting the second tubes to transfer to the fluid in the second tubes the heat stored in the heat storage medium, a plurality of connecting members each made from a heat conducting metal and each connected, in the planes common to the first and second tubes, between individual ones of the first tubes and individual ones of the second tubes, the first tubes, the second tubes and the connecting members being made from aluminum, means for stirring the heat storage medium in the fluid state, and means operatively coupled to the stirring means for interrupting the operation of the stirring means when the melted or partially melted heat storage medium reaches a state of crystallization to provide a viscous resistance to the operation of the stirring means, the heat storage medium being an aqueous system of sodium thiosulfate forming sodium thiosulfate pentahydrate in the crystalline state, and a soluble additive material selected selected from a group consisting of disodium hydrogen phosphate, trisodium phosphate and their potassium and ammonium analogs and controlling the pH of the medium and the size of the crystals produced in the medium.

3. The combination set forth in claim 2 wherein the soluble additive material is dissolved in the liquid heat storage medium in the range of approximately two percent (2%) to four percent (4%) by weight and the relative amounts of the disodium hydrogen phosphate, trisodium phosphate and their potassium and ammonium analogs in the soluble additive material is controlled to place the pH of the liquid in a predetermined range and to impart desirable physical properties to the crystalline compound of the heat storage medium.

4. In combination in apparatus for storing energy and for providing for a subsequent use of such energy, a container, a heat storage medium in the container, the medium having properties of melting and crystallizing in a limited temperature range and of remaining in the melted state at temperatures below the limited temperature range and of storing energy when converted to the melted state and of releasing such stored energy as heat when crystallized, first tubes made from heat conducting material and disposed in the heat storage medium and connected to provide for the passage of a first circulating fluid through the tubes, means for providing for the passage of the first fluid through the first tubes during the transfer of heat to the first fluid to convert the heat storage medium to the melted state and to increase its temperature above the temperature of conversion, second tubes made from heat conducting material and disposed in the heat storage medium and connected to provide for the passage of a second circulating fluid through the tubes and means for providing for the passage of the second fluid through the second tubes during the removal of heat from the storage medium to provide for the transfer of the heat stored in the container, bridging members made from a heat conducting material, the first and second tubes being disposed in spaced and nested relationship and being connected in the nested relationship by the bridging members, the heat storage medium being an aqueous sodium thiosulfate system, and a soluble additive material included in the medium to maintain the medium chemically basic and non-corrosive and to control various parameters of the crystals produced by the heat storage medium, the heat storage medium being sodium thiosulfate pentahydrate and the additive being selected from a group consisting of disodium hydrogen phosphate and trisodium phosphate and their potassium and ammonium analogs.

5. The combination set forth in claim 4 wherein a snout extends from the container and communicates with the container and means are disposed in the snout for providing a controlled initiation in the crystallization of the heat storage medium.

6. In combination in apparatus for storing energy and for providing for a subsequent use of such energy, a container, a heat storage medium disposed in the container and having properties of melting and crystallizing in a limited temperature range and of remaining melted at temperatures below the limited temperature range and of retaining stored energy in the melted state and of releasing such stored energy when cooling and crystallizing, first means disposed in the container for providing for the transfer of the energy to the heat storage medium in the container to heat and melt the medium in the container, and second means disposed in the container in spaced relationship to the first means for providing for the transfer of the heat released from the storage medium by the cooling and crystallization of the medium, the heat storage medium being an aqueous system of sodium thiosulfate, and an additive material dissolved in the liquid medium to limit the size, strength and cohesion of the crystals produced in the medium and to maintain the pH of the medium chemically basic and non-corrosive, fins disposed at spaced positions on the connecting members and extending in a direction transverse to the connecting members to facilitate the transfer of heat between the connecting members and the heat storage medium, the heat storage being an aqueous system of sodium thiosulfate forming sodium thiosulfate pentahydrate in the crystalline state, and a soluble additive material selected from a group consisting of disodium hydrogen phosphate and trisodium phosphate and their potassium and ammonium analogs, the soluble additive material being included in the heat storage medium to maintain the medium basic and non-corrosive and to control the size, strength and cohesion of the crystals produced in the crystallization of the molten heat storage medium, and members connecting the paired first and second tubes in the common plane.

7. In combination in apparatus for storing energy and for providing for a subsequent use of such energy as heat, first tubes disposed in looped and spaced relationship in the container and connected to provide for the passage of a first fluid through the tubes, means for providing for the passage of the first fluid through the first tubes at first controlled times, second tubes disposed in looped and spaced relationship in the container and connected to provide for the passage of a second fluid through the tubes at second controlled times corresponding to the release from the container of the heat stored in the container, the first and second tubes being disposed in paired relationship in a common plane, a heat storage medium disposed in the container and having properties of melting and crystallizing in a limited temperature range and of storing heat in the melted state at temperatures below the limited temperature range and of releasing heat when nucleated into the crystalline state in the limited temperature range, the heat storage medium abutting the first tubes to become melted and further heated at the first controlled times and abutting the second tubes to transfer to the fluid in the second tubes the heat stored in the heat storage medium, the heat storage medium being an aqueous system of sodium thiosulfate forming sodium thiosulfate pentahydrate in the crystalline state, and a soluble additive material included in the heat storage medium to maintain the medium basic and non-corrosive and to control the size physical properties of the crystals produced in the crystallization of the molten heat storage medium.

8. In combination in apparatus for storing energy and for providing for a subsequent use of such energy, a container, a heat storage medium disposed in the container and having properties of melting and crystallizing in a limited temperature range and of remaining melted at temperatures below the limited temperature range and of retaining stored energy in the melted state and of releasing such stored energy when cooling and crystallizing, first means disposed in the container for providing for the transfer of the energy to the heat storage medium in the container to heat and melt the medium in the container, and second means disposed in the container in spaced relationship to the first means for providing for the transfer of the heat released from the storage medium by the cooling and crystallization of the medium, the heat storage medium being an aqueous system of sodium thiosulfate, an additive material dissolved in the liquid medium to limit the size, strength and cohesion of the crystals produced in the medium and to maintain the pH of the medium chemically basic and non-corrosive, fins disposed at spaced positions on the connecting members and extending in a direction transverse to the connecting members to facilitate the transfer of heat between the connecting members and the heat storage medium, the heat storage being an aqueous system of sodium thiosulfate forming sodium thiosulfate pentahydrate in the crystalline state, and a soluble additive material being included in the heat storage medium to maintain the medium basic and non-corrosive and to control the size, strength and cohesion of the crystals produced in the crystallization of the molten heat storage medium, and members connecting the paired first and second tubes in the common plane, the additive material being selected from a group consisting of disodium hydrogen phosphate and trisodium phosphate and their potassium and ammonium analogs.

9. The combination set forth in claim 8 wherein the first and second means are disposed in spaced and nested relationship in common planes and wherein the first and second means in the common planes are paired and wherein connecting means bridge the paired first and second means in the common plane and wherein fins are disposed on the connecting means to facilitate the transfer of heat between the first and second means and the heat storage medium.

10. The combination set forth in claim 9 wherein a snout extends from the container in communication with the container and means are disposed in the snout for initiating a controlled crystallization of the sodium thiosulfate.

* * * * *